No. 828,148. PATENTED AUG. 7, 1906.
G. C. STANLEY.
AGRICULTURAL IMPLEMENT.
APPLICATION FILED MAY 29, 1906.

Witnesses:
Inventor.
Geo. C. Stanley
by
Attorneys.

UNITED STATES PATENT OFFICE.

GEORGE CALVIN STANLEY, OF BELLE VERNON, PENNSYLVANIA.

AGRICULTURAL IMPLEMENT.

No. 828,148. Specification of Letters Patent. Patented Aug. 7, 1906.

Application filed May 29, 1906. Serial No. 319,309.

*To all whom it may concern:*

Be it known that I, GEORGE CALVIN STANLEY, a citizen of the United States of America, residing at Belle Vernon, in the county of Fayette and State of Pennsylvania, have invented certain new and useful Improvements in Agricultural Implements, of which the following is a specification, reference being had therein to the accompanying drawings.

This invention relates to agricultural implements, and relates more particularly to a harrow designed for hillside-work.

The invention aims to provide a simple and inexpensive harrow wherein positive and reliable means are employed for effecting a disintegration of the soil over which the harrow is moved. To this end I have devised a harrow which will take a firm hold upon the soil and agitate it, especially upon a hillside, where the ordinary harrow has a tendency to slide over the soil without disturbing or disintegrating the same.

The detail construction of the harrow will be hereinafter more fully described and then specifically pointed out in the appended claims.

Figure 1:
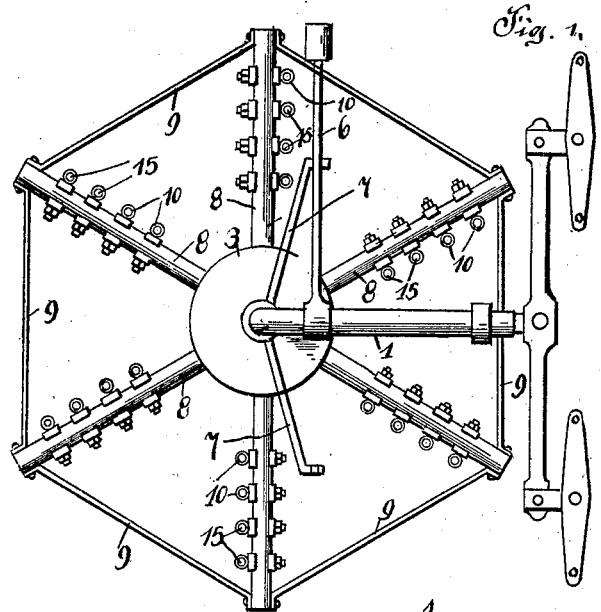
Figure 2:
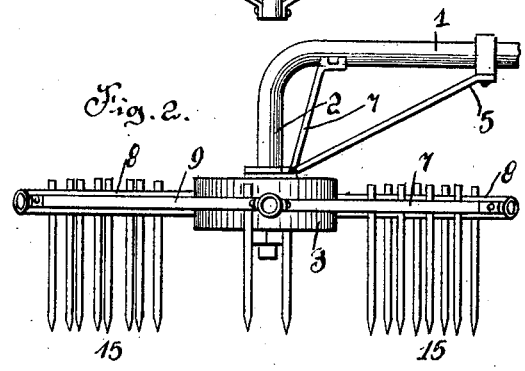
Figure 4:
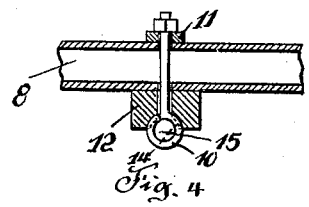
Figure 3:
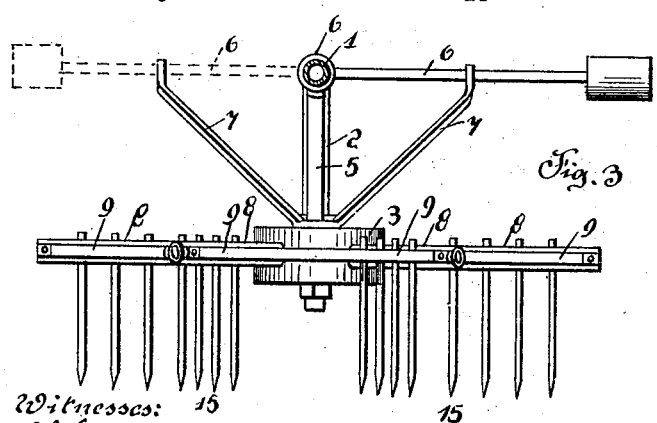

Referring to the drawings accompanying this specification, Figure 1 is a plan of my improved harrow. Fig. 2 is a side elevation of the same. Fig. 3 is a cross-sectional view taken on the line $x$ $x$ of Fig. 1, showing the main part of the harrow in front elevation. Fig. 4 is a detail sectional view of one of the tooth-carrying arms of the harrow.

To put my invention into practice, I construct my improved harrow of a spider-like frame consisting of a beam 1, having a depending stem 2, upon which is journaled an annular head or block 3. The forward end of the beam 1 is connected to a swingle or double tree, this end of the beam also being supported and braced from the stem 2 by a strap 5. Upon the beam 1 is pivoted a weighted arm 6, which is supported upon either side of the beam by angularly-disposed brackets 7 7, carried by the stem 2.

The annular head or block 3 is provided with a plurality of radially-disposed tooth-carrying arms 8, the outer ends of which are connected together by straps 9. Arranged transversely of each arm is a plurality of eyebolts 10, which pass through blocks 11 and 12, arranged upon the sides of the arms 8. The blocks 12 are recessed, as at 14, to accommodate the eyes of the bolts 10, thus permitting of said eyebolts clamping depending pointed teeth 15 to each arm. The teeth, which are made of strong and durable metal, protrude downwardly from the spider-like frame of the harrow and serve to agitate the soil over which the implement passes. When the implement is pulled over the soil, the weighted arm 6 depresses the one side of the implement, causing the same to revolve as it moves forward. To revolve the frame of the harrow in a reverse direction, the weighted arm is moved to the opposite side of the harrow.

In constructing a revoluble harrow having one side weighted I have devised an implement particularly adapted for hillside-work, the weighted arm of said implement tending to force the teeth upon one side of the implement into the soil and in this manner causing the frame of the harrow to rotate and bring the depending teeth of each arm into action, thus equally distributing the wear and tear upon a harrow.

The beam and the radially-disposed teeth-carrying arms of the harrow are preferably constructed of tubular metal, thus providing an implement which will withstand the rough usage to which harrows are ordinarily subjected.

Should one of the teeth of the harrow be broken, the eyebolt holding said tooth can be easily loosened and a new tooth placed in position to be used. The eyebolts firmly lock the teeth in engagement with the blocks 12 12, and the recesses 14 of said blocks, besides receiving the eyelet ends of the bolts, serve to retain the teeth in a vertical position.

A harrow constructed as above described will not choke or become clogged when contacting with loose objects, as corn-stubbles, stones, or roots, and as the harrow when in operation continuously revolves it will work out or force all objects rearwardly with which it contacts, thereby dispensing with the time and labor heretofore required in lifting the harrow over an object to free it from the same.

It is a well-known fact that after a piece of soil has been plowed it is cross-harrowed; but on a hillside it is necessary that the last harrowing of the hill be crosswise to prevent the soil from washing when it rains. With my improved harrow a hill can be harrowed from the bottom to the top, and vice versa, without leaving furrows which would cause the soil to wash, as the soil is equally disintegrated and leveled.

Such changes in the details of construction as are permissible by the appended claims may be resorted to without departing from the spirit and scope of the invention.

What I claim, and desire to secure by Letters Patent, is—

1. The combination, in a rotary harrow, of a draft-beam provided on its inner end with a depending stem, a head journaled on said depending stem, a plurality of radially-disposed tooth-carrying arms carried by said head, and teeth carried by said arms, a strap secured to the head and to the draft-beam, a pair of brackets carried by said stem and projecting outwardly in opposite direction therefrom, and a weighted arm swiveled on the draft-beam and supported when projecting to one side of the draft-beam by one of said brackets, and when projecting to the opposite side of the draft-beam to the other of said brackets.

2. The combination, in a rotary harrow, of a rotary frame embodying a central head, rotating arms connected to the head, teeth carried by the arms, a draft-beam on which the central head is rotatably mounted, a pair of supporting-braces projecting in opposite directions from the head, and a weighted arm swiveled on the draft-beam and supported by one of said supporting-braces when projecting to one side of the draft-beam and by the other supporting-brace when projecting to the opposite side of said draft-beam.

In testimony whereof I affix my signature in the presence of two witnesses.

GEORGE CALVIN STANLEY.

Witnesses:
J. M. SPRINGER.
EDGAR GILMORE.